April 9, 1946.  T. L. LAEREMAN  2,398,314
COFFEE MAKING MACHINE
Filed July 6, 1943

INVENTOR,
TASSO L. LAEREMAN.
BY
*A. Schapp*
ATTORNEY.

Patented Apr. 9, 1946

2,398,314

UNITED STATES PATENT OFFICE 2,398,314

COFFEE-MAKING MACHINE

Tasso L. Laereman, San Francisco, Calif.

Application July 6, 1943, Serial No. 493,645

9 Claims. (Cl. 99—283)

The present invention relates to improvements in a coffee making machine, and its principal object is to provide a machine in which coffee can be made commercially at a great saving of time on the part of the operator.

A further object of my invention is to provide a machine of the character described which makes liquid coffee that is of very fine quality and comes out of the machine absolutely clear.

A still further object of the invention is to provide a machine of the character described in which the washing of the urn or bowl is greatly facilitated.

It is further proposed to provide a coffee making machine that operates almost automatically, and in which the liquid coffee is withdrawn from the coffee bowl automatically at a predetermined time after the water has been poured upon the coffee.

It is further proposed to provide special straining means for withdrawing the liquid coffee and a special siphoning means insuring a quiet and steady flow of liquid coffee from the urn.

Another object of my invention is to provide simple means for flushing the grounds out of the bowl through a bottom aperture normally closed by a valve.

And finally, it is proposed to provide an arrangement and combination of cooperative features by which the successive operations in making coffee and in cleaning the bowl are carried out partly automatically, and partly by simple hand operation.

Further objects and advantages of my invention will appear as the specification proceeds and the novel features of the invention will be fully set forth in the claims hereto appended.

Figure 1:
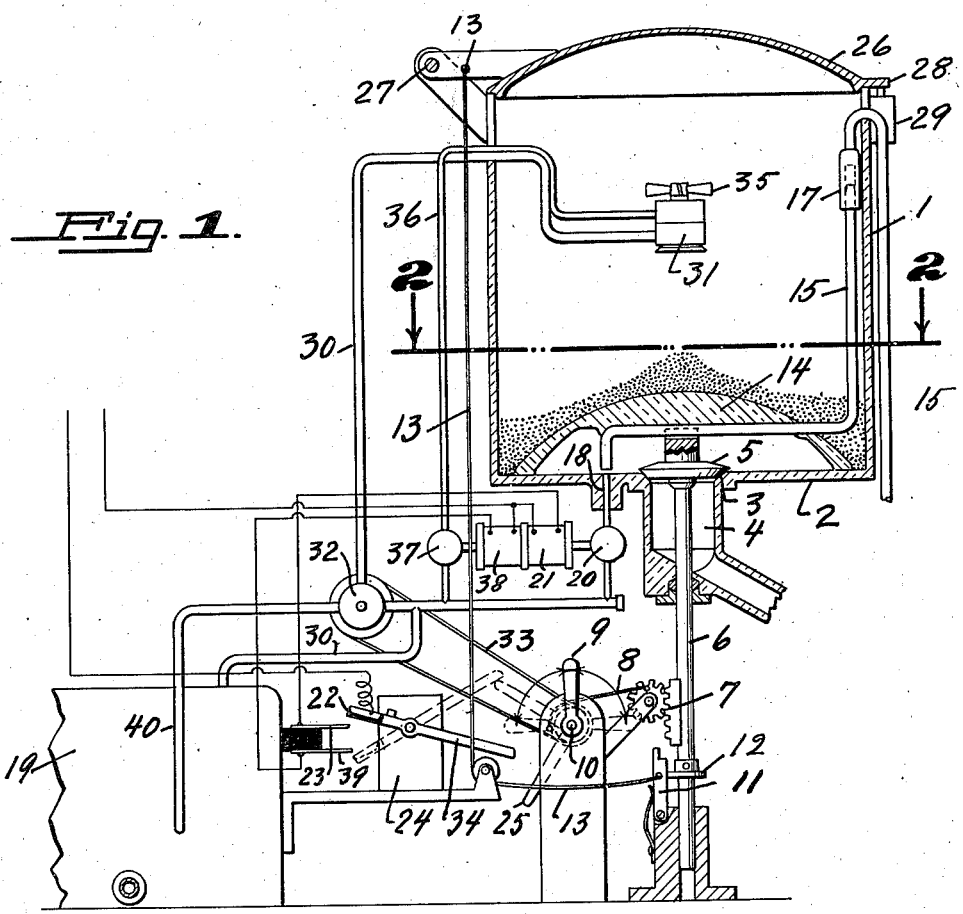
Figure 2:
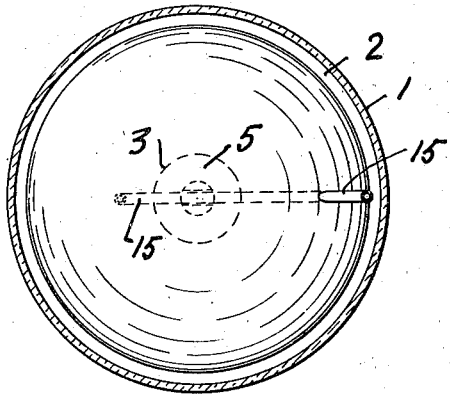

The preferred form of my invention is illustrated in the accompanying drawing forming part of this specification, in which:

Figure 1 is a vertical section through my coffee making machine; various operating mechanisms being shown schematically; and Figure 2, a horizontal section taken along line 2—2 of Figure 1.

While I have shown only the preferred form of my invention, I wish to have it understood that various changes or modifications may be made within the scope of the claims hereto attached without departing from the spirit of the invention.

Referring to the drawing in detail, the bowl 1 is preferably of glass or similar material and may be cylindrical in shape as shown, with a flat bottom, indicated at 2. The latter is formed with an opening 3 leading to a discharge or waste pipe 4, and adapted to be closed by means of a valve 5.

The valve has a stem 6 projecting downwardly therefrom and may be lifted off its seat by means of any suitable mechanism, as by the rack and pinion arrangement shown at 7 and actuated, through a suitable belt 8, by means of a handle 9 on a horizontal shaft 10.

A spring pressed locking key 11 is adapted to engage underneath a catch 12 for holding the valve in raised position, and is adapted to be pulled away from the catch for releasing the valve by means of a cord 13 operated by the lid for the bowl as hereinafter described.

A dome-shaped partition or diaphragm 14 is disposed on the bottom of the bowl. This partition is preferably made of glass and has a ground edge adapted to allow liquid to seep underneath the same while preventing the passing of any grounds or solid particles. While, it is realized that the seeping action is naturally slow, it should be understood that the dome-shaped partition is of considerable size, and thus presents a long circumference. Since the liquid seeps underneath the edge all along the circumference, the total seepage is amply sufficient to keep up with the discharge means, which may be described as follows:

A siphon tube 15 is preferably fastened to the partition 14 in such a manner that one extremity projects into the space underneath the partition within close proximity of the bottom 2 of the bowl, while the other end discharges through or over the upper section of the bowl in the well-known manner of a siphon. Since, in the operation of the machine, the partition 14 is lifted, the siphon should be provided with a sliding joint, as at 17, or any suitable equivalent.

For initiating siphoning action, I provide an injector 18 in the form of a tube connected to the water supply 19, and controlled by a valve 20 operated by a solenoid 21, which latter is energized by a contact member 22 striking a contact 23, the contact member 22 being operated by a timing device 24, which latter is set by an arm 25 on the shaft 10, when the handle 9 is operated in one direction.

When the valve 20 is opened, a jet of water is injected into the siphon tube and causes the liquid in the tube to rise to its maximum height in the tube and to descend for siphoning action. The siphon may discharge into a suitable reservoir, not shown, from which the liquid coffee may be withdrawn as desired. Suitable means, not shown, are provided for returning the solenoid and for closing the valve 20 when the contacts 22—23 separate.

While the injector 18 is here shown as discharging directly into the siphon 16, it is apparent that it may discharge at any suitable place underneath the dome, because the pressure of the injected liquid will start siphoning action no matter where applied.

When the valve 5 is raised, it lifts the dome-shaped partition 14 to provide space between the bottom edge of the partition and the bottom of the bowl to allow the coffee grounds to be flushed through said space into the discharge pipe 4.

The bowl 1 is provided with a lid 26 hinged as at 27. The lid may be lifted by means of a handle 28 or any other suitable means, and is preferably provided with a suitable retarding device, such as the dash pot 29 to ease its return movement. The lid operates the locking key 11 through the cord 13, which is attached to the lid as at 13'.

When the lid is lifted, ground coffee may be introduced manually to come to rest on the dome 14, which lies on the floor of the bowl at that time, so that no solid coffee particles may enter underneath the dome.

After the ground coffee has been introduced, the lid is closed manually and hot water is then introduced through the pipe 30 which extends through the wall of the bowl and terminates in a distributor head 31 arranged centrally in the bowl, and at an appropriate height above the bottom of the same.

The pipe 30 communicates with the hot water supply 19 and is controlled by a valve 32, which may be operated manually, through a belt 33, by a clockwise throw of the handle 9. When the water in the bowl reaches the right height, the handle 9 is manually returned to its original vertical position to stop the flow of the water.

The turning of the handle 9 in clockwise direction sets the timing device 24, through the arm 25 engaging an arm 34 of the timing device. After an appropriate time, say about three minutes, has expired for the brewing of the coffee, the contact member 22 strikes the contact 23 and thereby initiates the siphoning action for drawing off the liquid coffee in the manner previously described.

But during the brewing of the coffee, the coffee grounds rise to the top of the liquid and form a heavy layer floating on top of the liquid. This layer, as is well known in the art, has to be stirred in order to cause the solids to settle. To accomplish this I provide a propeller 35 in the bowl at the approximate height of the layer of coffee grounds. This propeller is driven in any suitable manner, by water pressure, or any other convenient means. Where water pressure is used, water may be admitted through the pipe 36 communicating with the water supply 19 and controlled by the valve 37 which latter is operated by a solenoid 38. This solenoid is energized by means of the contact 22 striking a second contact 39 arranged slightly in advance of contact 23. Thus, the contact member 22, on its return movement, first operates the valve 37 for actuating the propeller 35 and causing the solids to settle, and a little later strikes the contact 23 for starting the siphoning action.

Suitable means, not shown, are provided for returning the solenoid 38 and for closing the valve 37 after the desired function has been performed.

For flushing the bowl after the liquid coffee has been withdrawn, the same apparatus already described is used, but the handle 9 is turned in counter-clockwise direction. This operation lifts the valve 5 and the dome 14, through the rack and pinion arrangement 7, the parts being locked in this position by the key 11. It further opens the valve 32, which is of the three way type, to admit water to the distributing head 31, whereby the grounds are flushed past the bottom edge of the raised dome 14 and into the waste pipe 4.

It is desirable to use for the flushing operation, water of slightly lower temperature than that used for brewing the coffee, and the water for the flushing operation may, therefore, be taken from the supply at a lower elevation, as through the pipe 40 connecting with the three-way valve 32.

The operation of my coffeemaking machine may be described as follows: The drawing shows the different parts in the positions they would occupy after the coffee has been poured into the bowl 1. In this position, the valve 5 is closed, the dome 14 rests on the floor of the bowl and the handle 9 is in neutral or upright position.

For filling hot water into the bowl, the operator turns the handle 9 clockwise. This opens the valve 32 to admit hot water from the top of the supply tank 19 to the distributor head 31 and into the bowl. It also sets the timing device 24 through the arms 25 and 34. After the bowl is filled to a suitable height, the operator returns the handle 9 to neutral position for shutting off the water supply.

The timing device begins to operate, and after a suitable time, the contact member 22 strikes the contact 39, energizing solenoid 38 and opening valve 37 to operate the propeller 35 for breaking up the layer of coffee grounds on top of the liquid in the bowl and for causing the grounds to settle.

Shortly, thereafter, the contact member 22 of the timing device strikes the second contact 23, energizing the solenoid 21 and opening the valve 20 for injecting water into the siphon tube 15 and for starting siphoning action. The liquid coffee is now slowly drained from underneath the dome-shaped partition 14 and discharged into a suitable reservoir.

It should be particularly noted that the liquid coffee is thoroughly strained and filtered by passing through the coffee grounds lying on top of the dome and by seeping underneath the edge of the dome. As a result perfectly clear coffee is obtained, and no solid particles are siphoned over.

After the liquid coffee has been siphoned off, the operator turns the handle 9 in counter-clockwise direction. This operation raises the valve 5 and the dome 14 through the rack and pinion arrangement 7 and causes the locking key 11 to lock the parts in elevated position. It also opens the valve 32 for admitting water under pressure to the distributor head 31 and for flushing the bowl. All of the coffee grounds are thus washed out of the bowl thoroughly and are discharged into the waste pipe 4. The operator then returns the handle 9 to neutral position.

To begin a new operation, the attendant lifts the lid 26, which causes the cord 13 to pull the locking key 11 from underneath the catch 12 and allows the valve and the dome 14 to be seated again. He then fills a new quantity of ground coffee into the bowl, allows the lid to slowly drop back into position, and starts a new series of operations, as previously described.

I claim:

1. In a coffee making machine, a bowl for holding ground coffee and liquid coffee, a dome-shaped partition overlying the bottom of the bowl and having a straining fit with the latter, a siphon tube carried by the partition and having one end projecting into the space underneath the partition and means for injecting a liquid into said space for starting siphoning operations.

2. In a coffee making machine, a bowl, a dome-shaped partition overlying the bottom of the bowl and having a straining fit with the latter and being adapted to support ground coffee thereon, means for feeding water into the bowl above the partition, means for siphoning liquid coffee from the space below the partition, and means operable in predetermined timed relation to the feeding operation for initiating the siphoning action.

3. In a coffee making machine, a bowl for holding coffee solids therein, mechanical means for feeding water into the bowl, a timing device, means operable in conjunction with the water feeding means for setting the timing device, means for agitating coffee solids floating on the liquid, means for withdrawing liquid coffee from the bowl, and means operated by the timing device for successively actuating the agitating and withdrawal means.

4. In a coffee making machine, a bowl for holding coffee grounds and liquid coffee, the bowl having a closed, glass-like bottom substantially commensurate with its lateral dimensions, a dome-shaped partition over the bottom of the bowl to support the grounds thereon, the partition having a ground glass bottom edge fitting on the bottom of the bowl and substantially co-extensive therewith to allow liquid to seep therebetween, and siphon means for withdrawing liquid coffee from underneath the partition, the slow seepage serving to exclude all solid matter from the space underneath the partition and the large seepage area serving to feed the liquid at a sufficient speed to maintain siphon action.

5. In a coffee making machine, a bowl for holding ground coffee and liquid coffee, a partition overlying the bottom of the bowl to form a chamber therewith and having a straining fit with the latter, a siphon tube having one end projecting into the chamber underneath the partition and means for injecting a liquid into said chamber for starting siphoning operations.

6. In a coffee making machine, a bowl for holding ground coffee and liquid coffee, a partition overlying the bottom of the bowl and having a straining fit with the latter, the partition and the bowl being shaped to form a chamber therebetween, a siphon tube carried by the partition and having one end projecting into the chamber, and means for injecting a liquid into said chamber for starting siphoning operations.

7. In a coffee making machine, a bowl, a partition overlying the bottom of the bowl and having a straining fit with the latter and being adapted to support ground coffee thereon, the partition and the bottom of the bowl being shaped to form a chamber therebetween, means for feeding water into the bowl above the partition, means for siphoning liquid coffee from the said chamber, and means operable in predetermined timed relation to the feeding operation for initiating siphoning action.

8. In a coffee making machine, a bowl for holding ground coffee and liquid coffee, a partition overlying the bottom of the bowl and having a straining fit with the latter, the partition and the bowl being shaped to form a chamber therebetween, a siphon tube having one end projecting into the chamber, and means for injecting a liquid into said chamber for starting siphoning operations.

9. In a coffee making machine, a bowl for holding coffee grounds and liquid coffee, the bowl having a closed, glass-like bottom substantially commensurate with its lateral dimensions, a partition over the bottom of the bowl to support the grounds thereon, the partition and the bottom of the bowl being shaped to form a chamber therebetween, and the partition having a ground glass edge fitting on the bottom of the bowl and substantially co-extensive therewith to allow liquid slow seepage therebetween, and siphon means for withdrawing liquid coffee from said chamber, the slow seepage serving to exclude all solid matter from the chamber and the large seepage area serving to feed the liquid at a sufficient speed to maintain siphon action.

TASSO L. LAEREMAN.